(12) United States Patent
Shahi et al.

(10) Patent No.: US 11,743,878 B2
(45) Date of Patent: Aug. 29, 2023

(54) CARRIER AGGREGATION OPTIMIZATION USING MACHINE LEARNING

(71) Applicant: QUALCOMM Incorporated, San Diego, CA (US)

(72) Inventors: Sharad Shahi, Erie, CO (US); Madhup Chandra, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/148,601

(22) Filed: Dec. 30, 2022

(65) Prior Publication Data
US 2023/0144151 A1    May 11, 2023

Related U.S. Application Data

(63) Continuation of application No. 17/303,617, filed on Jun. 3, 2021, now Pat. No. 11,558,872.

(51) Int. Cl.
| | |
|---|---|
| *H04W 72/04* | (2023.01) |
| *G06N 3/04* | (2023.01) |
| *H04W 24/02* | (2009.01) |
| *H04W 72/0453* | (2023.01) |
| *H04W 72/51* | (2023.01) |

(52) U.S. Cl.
CPC .......... *H04W 72/0453* (2013.01); *G06N 3/04* (2013.01); *H04W 24/02* (2013.01); *H04W 72/51* (2023.01)

(58) Field of Classification Search
CPC ............. H04W 72/0453; H04W 24/02; H04W 72/048; G06N 3/04
See application file for complete search history.

(56) References Cited

U.S. PATENT DOCUMENTS

| | | | |
|---|---|---|---|
| 11,558,872 B2 | 1/2023 | Shahi et al. | |
| 2017/0195895 A1* | 7/2017 | Ponnuswamy | ........ H04W 24/02 |
| 2017/0201420 A1* | 7/2017 | Chen | .................... H04B 7/0877 |
| 2019/0261225 A1* | 8/2019 | Eswarakava | .......... H04W 48/06 |
| 2020/0252142 A1 | 8/2020 | Bedekar | |

FOREIGN PATENT DOCUMENTS

| | | |
|---|---|---|
| WO | 2017091115 A1 | 6/2017 |
| WO | 2021004629 A1 | 1/2021 |

OTHER PUBLICATIONS

International Search Report and Written Opinion—PCT/US2022/072719—ISA/EPO—dated Sep. 19, 2022.

* cited by examiner

*Primary Examiner* — Joshua L Schwartz
(74) *Attorney, Agent, or Firm* — Harrity & Harrity, LLP

(57) ABSTRACT

Various aspects of the present disclosure generally relate to wireless communication. In some aspects, an apparatus of a user equipment (UE) may determine a set of inputs to a neural network configured to predict radio frequency channel conditions or a user context associated with the UE. In some aspects, the set of inputs includes historical data related to a wireless environment, a communication pattern, or a behavior pattern associated with the UE. The apparatus of the UE may determine, using the neural network and based at least in part on the set of inputs, an optimal number of aggregated carriers to maximize one or more of a power parameter or a performance parameter. The apparatus of the UE may communicate using the optimal number of aggregated carriers. Numerous other aspects are described.

29 Claims, 6 Drawing Sheets

CARRIER AGGREGATION OPTIMIZATION USING MACHINE LEARNING

RELATED APPLICATION

This application is a continuation of U.S. patent application Ser. No. 17/303,617, entitled "CARRIER AGGREGATION OPTIMIZATION USING MACHINE LEARNING," filed Jun. 3, 2021 (now U.S. Pat. No. 11,558,872), which is incorporated herein by reference in its entirety.

FIELD OF THE DISCLOSURE

Aspects of the present disclosure generally relate to wireless communication and to techniques and apparatuses associated with carrier aggregation optimization using machine learning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5 G Node B, or the like.

The above multiple access technologies have been adopted in various telecommunication standards to provide a common protocol that enables different user equipment to communicate on a municipal, national, regional, and even global level. NR, which may also be referred to as 5 G, is a set of enhancements to the LTE mobile standard promulgated by the 3 GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP)(CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by an apparatus of a user equipment (UE) includes determining a set of inputs to a neural network configured to predict radio frequency (RF) channel conditions or a user context associated with the UE, wherein the set of inputs includes historical data related to a wireless environment, a communication pattern, or a behavior pattern associated with the UE; determining, using the neural network and based at least in part on the set of inputs, an optimal number of aggregated carriers to maximize one or more of a power parameter or a performance parameter; and communicating using the optimal number of aggregated carriers.

In some aspects, an apparatus for wireless communication at a UE includes a memory and one or more processors, coupled to the memory, configured to: determine a set of inputs to a neural network configured to predict RF channel conditions or a user context associated with the UE, wherein the set of inputs includes historical data related to a wireless environment, a communication pattern, or a behavior pattern associated with the UE; determine, using the neural network and based at least in part on the set of inputs, an optimal number of aggregated carriers to maximize one or more of a power parameter or a performance parameter; and communicate using the optimal number of aggregated carriers.

In some aspects, a non-transitory computer-readable medium storing a set of instructions for wireless communication includes one or more instructions that, when executed by one or more processors of a UE, cause the UE to: determine a set of inputs to a neural network configured to predict RF channel conditions or a user context associated with the UE, wherein the set of inputs includes historical data related to a wireless environment, a communication pattern, or a behavior pattern associated with the UE; determine, using the neural network and based at least in part on the set of inputs, an optimal number of aggregated carriers to maximize one or more of a power parameter or a performance parameter; and communicate using the optimal number of aggregated carriers.

In some aspects, an apparatus for wireless communication includes means for determining a set of inputs to a neural network configured to predict RF channel conditions or a user context associated with the apparatus, wherein the set of inputs includes historical data related to a wireless environment, a communication pattern, or a behavior pattern associated with the apparatus; means for determining, using the neural network and based at least in part on the set of inputs, an optimal number of aggregated carriers to maximize one or more of a power parameter or a performance parameter; and means for communicating using the optimal number of aggregated carriers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5 G or NR radio access technology (RAT), aspects of the present disclosure can be applied to other RATs, such as a 3 G RAT, a 4 G RAT, and/or a RAT subsequent to 5 G (e.g., 6 G).

Figure 1:
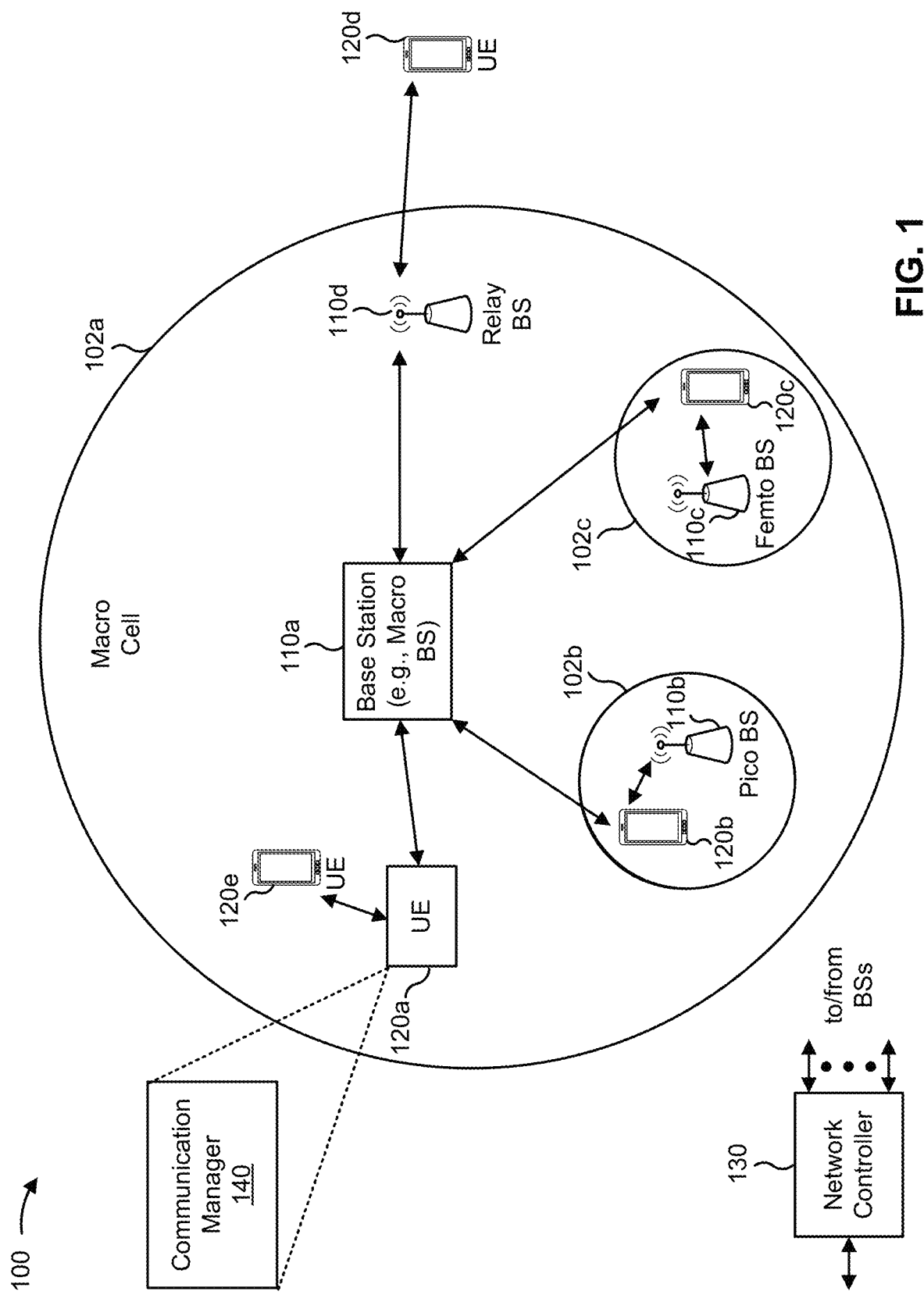
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5 G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5 G node B (NB), an access point, a transmit receive point (TRP), or the like. Each BS may provide communication coverage for a particular geographic area. In 3 GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5 G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5 G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine a set of inputs to a neural network configured to predict radio frequency (RF) channel conditions or a user context associated with the UE 120, wherein the set of inputs includes historical data related to a wireless environment, a communication pattern, or a behavior pattern associated with the UE 120; determine, using the neural network and based at least in part on the set of inputs, an optimal number of aggregated carriers to maximize one or more of a power parameter or a performance parameter; and communicate using the optimal number of aggregated carriers. Additionally, or alternatively, the communication manager 140 may perform one or more other operations described herein.

As indicated above, FIG. 1 is provided as an example. Other examples may differ from what is described with regard to FIG. 1.

Figure 2:
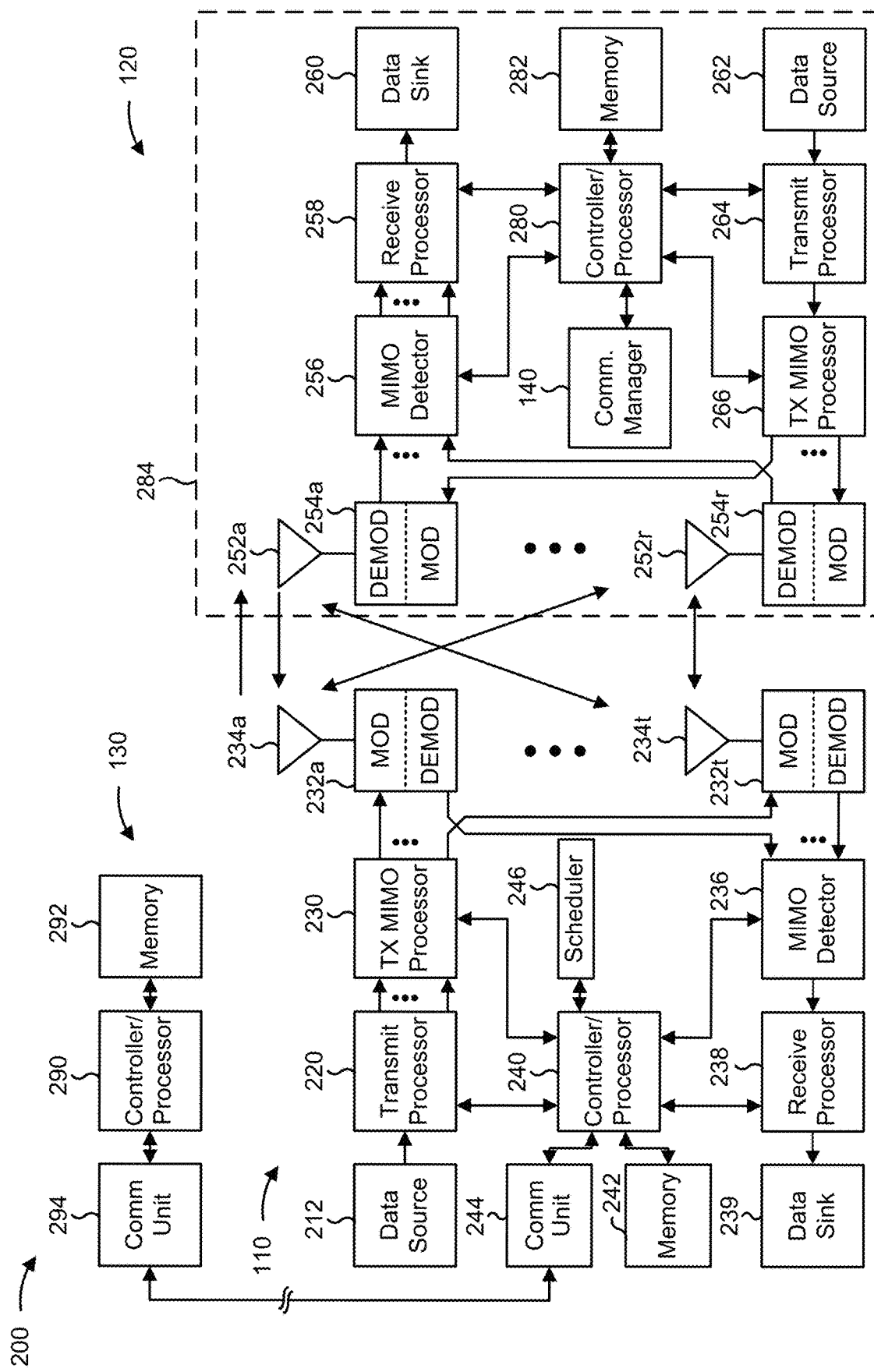
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 3-5)

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 3-5).

Controller/processor 240 of base station 110, controller/processor 280 of UE 120, and/or any other component(s) of FIG. 2 may perform one or more techniques associated with carrier aggregation optimization using machine learning, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, the UE 120 includes means for determining a set of inputs to a neural network configured to predict RF channel conditions or a user context associated with the UE 120, wherein the set of inputs includes historical data related to a wireless environment, a communication pattern, or a behavior pattern associated with the UE 120; means for determining, using the neural network and based at least in part on the set of inputs, an optimal number of aggregated carriers to maximize one or more of a power parameter or a performance parameter; and/or means for communicating using the optimal number of aggregated carriers. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In a wireless network, a UE may communicate using carrier aggregation, which enables two or more component carriers (sometimes referred to as carriers) to be combined (e.g., into a single channel) for the UE to enhance data capacity and/or improve reliability. For example, in a carrier aggregation configuration associated with a UE, multiple component carriers can be combined in the same frequency band, in different frequency bands, and/or in different frequency ranges. Additionally, or alternatively, contiguous or non-contiguous component carriers can be combined. In general, a base station may configure carrier aggregation for a UE, such as in a radio resource control (RRC) message, a medium access control (MAC) control element (MAC-CE), downlink control information (DCI), and/or another signaling message.

In some aspects, carrier aggregation may be configured in an intra-band contiguous mode, where the aggregated carriers are contiguous to one another and are in the same frequency band. Additionally, or alternatively, carrier aggregation may be configured in an intra-band non-contiguous mode, where the aggregated carriers are non-contiguous to one another and are in the same frequency band. Additionally, or alternatively, carrier aggregation may be configured in an inter-band non-contiguous mode, where the aggregated carriers are non-contiguous to one another and are in different frequency bands. Furthermore, in a wireless network that supports communication in the mmW spectrum, mmW frequency ranges (e.g., FR2, which may span from 24.25 GHz to 52.6 GHz, and/or frequency range 4 (FR4), which may span from 52.6 GHz to 114.25 GHz) may support both intra-band carrier aggregation and inter-band carrier aggregation. For example, in the mmW spectrum, intra-band carrier aggregation may bond or otherwise aggregate multiple channelizations within a particular frequency range, while inter-band carrier aggregation may use component carriers or other frequency components (e.g., bandwidth parts or other frequency-related assignments) across different frequency bands and/or frequency ranges (e.g., 28 GHz, 39 GHz, and/or 60 GHz, among other examples). For example, an inter-band carrier aggregation configuration in the mmW spectrum may include two or more component carriers in different frequency bands within FR2, two or more component carriers in different frequency bands within FR4, and/or at least one component carrier in FR2 and at least one component carrier in FR4, among other examples.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In existing wireless networks, when a UE is configured to communicate using carrier aggregation, the UE may generally monitor current RF conditions to determine whether to maintain a primary carrier and/or one or more secondary carriers. For example, a UE may determine whether to maintain the primary carrier and/or one or more secondary carriers that are configured for the UE or trigger a virtual radio link failure (vRLF) to deactivate the primary carrier and/or one or more secondary carriers based on a current snapshot of an RF channel (e.g., one or more measurements obtained over a most recent snapshot period, such as the previous one millisecond (ms)). However, existing techniques to manage activated carriers (e.g., by activating one or more carriers and/or triggering vRLF to deactivate one or more carriers) tend to be based on relatively simple RF conditions. For example, a UE may trigger vRLF to deactivate a carrier associated with a signal-to-noise ratio (SNR) that satisfies one or more criteria (e.g., deactivating a carrier if the SNR associated with the carrier fails to equal or exceed a threshold). In another example, a UE may activate a carrier if and/or when the SNR associated with the carrier satisfies a condition (e.g., the SNR associated with the carrier equals or exceeds a threshold and the SNR is sustained at a level that satisfies the threshold for a threshold duration).

In general, the relatively simple RF conditions that are typically used to activate or deactivate one or more carriers may work effectively in laboratory (e.g., testing or simulation) environments and/or other environments where fluctuation in RF conditions tends to be relatively simple or predictable (e.g., at low carrier frequencies). However, mmW communication (e.g., in FR2 and/or FR4) tends to be associated with highly complex RF conditions because mmW signals have a higher frequency and a shorter wavelength than various other radio waves used for communications (e.g., sub-6 GHz communications). As a result, compared to radio waves that may fluctuate in a simple or predictable manner, mmW signals often have shorter propagation distances, may be subject to atmospheric attenuation, and/or may be more easily blocked and/or subject to penetration loss through objects or other obstructions, among other examples. Accordingly, in some cases, beamforming may be used to improve performance for mmW communication, whereby a transmitter may generate a transmit beam that is steered in a particular direction to provide a beamforming gain. The transmit beam may be reflected, diffracted, and/or scattered by one or more clusters, obstacles, and/or materials within an environment between or around the transmitter and the receiver. For example, a wireless signal may be reflected by lamp posts, vehicles, glass/window panes, and/or metallic objects, may be diffracted by edges or corners of buildings and/or walls, and/or may be scattered via irregular objects such as walls and/or human bodies (e.g., a hand blocking an antenna module when a device is operated in a gaming mode). In such cases, the current RF channel snapshot that a UE uses to determine whether to activate, deactivate, and/or maintain component carriers may fail to reflect and/or may inaccurately reflect highly dynamic and/or complex RF conditions.

Some aspects described herein relate to techniques and apparatuses to optimize a carrier aggregation configuration using machine learning. For example, in some aspects, a UE may determine or otherwise obtain a set of inputs to a neural network that is configured (e.g., trained) to predict RF channel conditions or a user context associated with the UE. For example, the set of inputs may include historical data related to a wireless environment, a communication pattern, and/or a behavior pattern associated with the UE, and the neural network may be configured to perform a neural network function to predict, based on the set of inputs, the RF channel conditions and/or user context expected to occur over a future duration. Accordingly, in some aspects, the neural network may be configured to output information that indicates an optimal carrier aggregation configuration for the future duration based on the predicted RF channel conditions and/or user context expected to occur over the future duration. Furthermore, in some aspects, the neural network may be configured to output an optimal carrier aggregation that maximizes a performance parameter or a power parameter. For example, as described herein, the neural network may output information that indicates an optimal number of aggregated carriers, an optimal discontinuous reception (DRX) configuration, an optimal number of MIMO layers, and/or a minimum scheduling offset to maximize the power parameter (e.g., to minimize power consumption) or the performance parameter (e.g., to increase bandwidth) based on the RF channel conditions and/or user context expected to occur over a future duration. In this way, by using the neural network to predict RF channel conditions and/or user behavior in a complex and/or dynamic wireless environment, the UE may apply a carrier aggregation configuration that best suits the predicted RF channel conditions and/or user behavior depending on the relative importance of power consumption and/or aggregated uplink or downlink bandwidth over the future duration.

Figure 3:
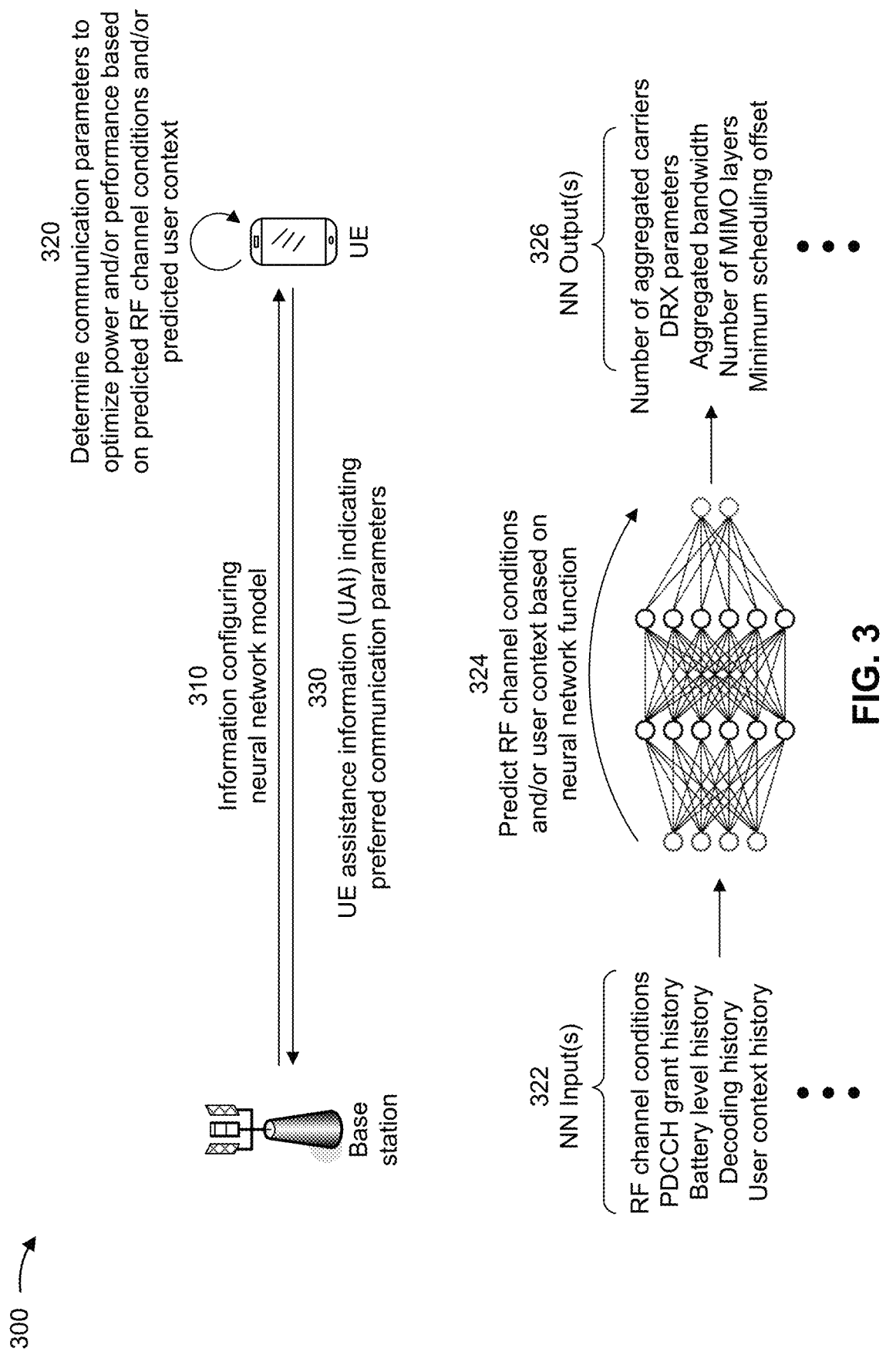
FIG. 3 is a diagram illustrating an example associated with carrier aggregation optimization using machine learning, in accordance with the present disclosure.

FIG. 3 is a diagram illustrating an example 300 associated with carrier aggregation optimization using machine learning, in accordance with the present disclosure. As shown in FIG. 3, example 300 includes communication between a base station (e.g., base station 110) and a UE (e.g., UE 120). In some aspects, the base station and the UE may be included in a wireless network, such as wireless network 100. In some aspects, the base station and the UE may communicate via a wireless access link, which may include an uplink and a downlink.

As shown in FIG. 3, and by reference number 310, the base station may transmit, and the UE may receive, information to configure a neural network (or machine learning) model that is configured to predict future RF channel conditions and/or a future user context (e.g., a user behavior or activity pattern). For example, in some aspects, the neural network model may be trained to predict future RF channel conditions and/or a future user context using machine learning techniques, as described in further detail elsewhere herein. In some aspects, the neural network model may include a model structure and a parameter set, which may be defined by a network operator (e.g., an operator of the wireless network that includes the base station), an infrastructure vendor, a third party (e.g., an original equipment manufacturer), and/or another suitable entity. In some aspects, the base station may configure the neural network model by transmitting, to the UE, information indicating a model identifier that uniquely identifies the neural network model in the wireless network to enable the UE to obtain the neural network model (e.g., from a local or network storage location).

In some aspects, as described herein, the neural network model may include a model structure, which may be based on a collection of nodes (e.g., artificial neurons) that model connections among neurons in a biological brain. For example, in some aspects, the model structure may include an input layer, an output layer, and one or more intermediate layers (sometimes referred to as hidden layers or computation layers) between the input layer and the output layer. In some aspects, one or more nodes in the neural network model may be associated with an activation function that defines an output of the given one or more inputs. For example, the activation function may include a ridge activation function, a radial activation function, a fold activation function, and/or another suitable activation function. Furthermore, in some aspects, the neural network model may include a parameter set, which may indicate weights associated with the neural network model (e.g., weights applied to different inputs and/or parameters to be minimized, maximized, or otherwise optimized) and/or other suitable configuration parameters associated with the neural network model. In some aspects, the weights and/or communication parameters may be context-specific (e.g., for a given location or UE configuration). Accordingly, in some aspects, the neural network model may use the model structure and the parameter set to implement a neural network function to predict future RF channel conditions and/or a future user context and to determine optimal communication parameters (e.g., an optimal carrier aggregation configuration) that maximizes a power parameter or a performance parameter given the predicted RF channel conditions and/or the predicted user context.

As further shown in FIG. 3, and by reference number 320, the UE may use the configured neural network model to determine one or more communication parameters that may maximize a power parameter (e.g., by maximizing a power savings parameter and/or minimizing a power consumption parameter) and/or maximize a performance parameter (e.g., by maximizing throughput). For example, in a carrier aggregation, a larger number of aggregated carriers may generally increase throughput, but the larger number of aggregated carriers may also lead to increased power consumption. Correlatively, reducing the number of aggregated carriers may increase power savings, which is associated with a tradeoff related to decreased throughput. Accordingly, as described herein, the UE may determine a set of inputs to be provided to an input layer of the neural network model, which may be configured to predict RF channel conditions and/or a user context over a future duration based on the set of inputs. Furthermore, as described herein, the parameter set associated with neural network model may include a first set of weights associated with the power parameter and a second set of weights associated with the power parameter, and the respective weights may be used in the neural network model to determine the optimal communication parameters to balance tradeoffs between power and performance given the predicted RF channel conditions and the predicted user context.

For example, as shown by reference number 322, a set of inputs to the neural network model may include historical data related to a wireless environment associated with the UE, a communication pattern associated with the UE, and/or a behavior pattern associated with the UE. For example, in some aspects, the historical data may include a measurement history related to RF channel conditions in a wireless environment associated with the UE, such as an SNR measurement history, a signal-to-interference-plus-noise ratio (SINR) measurement history, an RSRP measurement history, and/or an RSRQ measurement history for a current serving cell and/or one or more neighbor cells. Furthermore, in some aspects, the historical data may include a reference signal history. For example, the UE may be configured to receive and measure one or more reference signals (e.g., a channel state information reference signal (CSI-RS) and/or a DMRS) in order to perform downlink channel estimation, whereby the historical data input to the neural network model may include a CSI-RS, DMRS, and/or other suitable reference signal history that can be used to estimate and/or predict complex fluctuations and/or trends in RF channel conditions.

As further shown, the set of inputs to the neural network model may include a physical downlink control channel (PDCCH) grant history, which may include historical data related to one or more downlink grants (e.g., for a physical downlink shared channel (PDSCH) transmission to the UE) and/or historical data related to one or more uplink grants (e.g., for a physical uplink shared channel (PUSCH) transmission by the UE). In some aspects, the PDCCH grant history may include historical data such as frequency domain and/or time domain resource assignments associated with downlink and/or uplink grants, MCS indexes associated with downlink and/or uplink grants, and/or transmit power control commands for associated with downlink and/or uplink grants, among other examples. Additionally, or alternatively, the set of inputs may include a battery level history (e.g., power consumption that occurs when a user is engaged in different activities), a decoding history (e.g., historical data related to DCI messages and/or cyclic redundancy check (CRC) misses or failures), and/or a user context history related to user behavior patterns over time (e.g., locations, personal interests, and/or preferences, among other examples).

As further shown in FIG. 3, and by reference number 324, the neural network model may use the set of inputs, which may include historical data and/or one or more current observations related to the wireless environment, communication pattern, and/or behavior pattern associated with the UE, to predict RF channel conditions and/or a user context over a future duration (e.g., the next X milliseconds). In some aspects, the neural network model may use any suitable machine learning technique to predict the RF channel conditions and/or the user context based on a neural network function. Furthermore, in some aspects, the neural network model may be configured to predict a preference (and/or a degree of preference) to maximize the power parameter (e.g., minimize power consumption) or the performance parameter (e.g., maximize throughput) over the future duration. For example, if the neural network predicts a user context of video streaming, gaming, and/or other communication requiring high bandwidth, low latency, and/or other high performance metrics, the neural network model may adapt user-specified initial weights for the power parameter and/or the performance parameter such that the performance parameter is maximized. In another example, if the neural network predicts that the UE will soon have a low battery level or that the user context involves low-priority communication that can be performed in the background over a long duration, the neural network model may be configured to output optimal communication parameters to maximize the power parameter.

Accordingly, as described herein, the neural network model may be trained to predict RF channel conditions and/or a user context based on the set of inputs, and to output information that indicates one or more communication parameters to optimize tradeoffs between power and performance based on user-specified initial weights that may be optimized over time using machine learning techniques. For example, based on information that the UE collects related to fluctuations and/or trends in RF channel conditions and/or user behavior over time, the neural network model may be configured to accurately predict the RF channel conditions and/or user context expected to occur in a future duration and to predict whether performance or power is more important given the predicted RF channel conditions and/or the predicted user context. Furthermore, in some aspects, the neural network model may determine the relative importance of performance and power over the future duration to determine how to best optimize or adjust the user-specified initial weights for the performance and power parameters.

As further shown in FIG. 3, and by reference number 326, an output from the neural network may include one or more optimal communication parameters to balance a tradeoff between power and performance for RF channel conditions and/or a user context that are predicted based on the set of inputs (e.g., the historical data and/or current observations related to measurements, reference signals, downlink or uplink grants, battery levels, DCI or CRC misses or failures, and/or user behavior patterns). For example, in a carrier aggregation configuration, a larger number of aggregated carriers may be associated with increased performance and reduced power savings (or increased power consumption), and a smaller number of aggregated carriers may be associated with reduced performance and increased power savings (or reduced power consumption). Accordingly, in one example, the neural network may indicate a number of aggregated carriers to be used to optimize the performance parameter or the power parameter under different RF channel conditions. For example, as shown in the following table, a relatively higher number of aggregated carriers may be used when the performance parameter is to be maximized and/or when predicted RF channel conditions are strong, and a relatively lower number of aggregated carriers may be used when the power parameter is to be maximized and/or when predicted RF channel conditions are weak.

| Predicted RF channel conditions | Predicted optimization preference | Optimal number of aggregated carriers |
| --- | --- | --- |
| Strong | Performance | Use highest number of aggregated carriers |
| Strong | Power | Use lower number of aggregated carriers |
| Weak | Performance | Use medium number of aggregated carriers |
| Weak | Power | Use lowest number of aggregated carriers |

Accordingly, in some aspects, the output from the neural network model may generally indicate one or more communication parameters to optimize power and/or performance based on predicted RF channel conditions and/or a predicted user context over a future duration. For example, because the number of aggregated carriers used in a carrier aggregation configuration may impact power and performance, the communication parameters that are output by the neural network model may include an optimal number of aggregated carriers and/or a number of secondary carriers to be activated or deactivated such that a total number of aggregated carriers equals the optimal number of aggregated carriers. Additionally, or alternatively, the one or more communication parameters may include optimal DRX parameters (e.g., a long DRX cycle, a short DRX cycle, and/or a DRX inactivity timer), a maximum aggregated bandwidth (e.g., a maximum downlink bandwidth or maximum uplink bandwidth for one or more frequency ranges), a maximum number of MIMO layers (e.g., a maximum number of downlink or uplink MIMO layers for one or more frequency ranges), and/or a minimum scheduling offset (e.g., a k0 or k2 value that defines a slot offset between a PDCCH and a scheduled PDSCH or PUSCH for different subcarrier spacings), among other examples. In some aspects, the UE may autonomously apply one or more of the communication parameters output by the neural network model (e.g., triggering vRLF to deactivate one or more secondary carriers). In this way, the communication parameters output from the neural network model may enable the UE to proactively select the optimal number of aggregated carriers and/or other communication parameters to be used based on RF channel conditions and/or a user context that is predicted to occur, before an actual peak or valley in RF channel conditions is reached.

As further shown in FIG. 3, and by reference number 330, the UE may transmit, and the base station may receive, UE assistance information (UAI) that indicates one or more preferred communication parameters based on the optimal communication parameters output by the neural network model. For example, the base station may configure (e.g., instruct) the UE to transmit the UAI to indicate the preferred communication parameters, or the UE may transmit the UAI when one or more internal conditions are satisfied. For example, the UE may transmit the UAI based on detecting internal overheating, detecting that the UE is no longer experiencing an overheating condition, based on determining an initial preference for one or more communication parameters, and/or based on a change to a preference for one or more communication parameters, among other examples. Accordingly, in some aspects, the UAI transmitted to the base station may indicate one or more preferences related to communication parameters to be configured for the UE, such as a number of aggregated carriers, DRX parameters, aggregated bandwidth, a number of MIMO layers, and/or a minimum scheduling offset, among other examples. In this way, the base station may update the configured communication parameters for the UE based on the UAI such that the base station can properly configure the UE to optimize power and/or performance (e.g., after handover to a different serving cell and/or for any communication parameters that cannot be autonomously applied at the UE, such as DRX parameters and/or minimum scheduling offsets that depend on network synchronization).

As indicated above, FIG. 3 is provided as an example. Other examples may differ from what is described with regard to FIG. 3.

Figure 4:
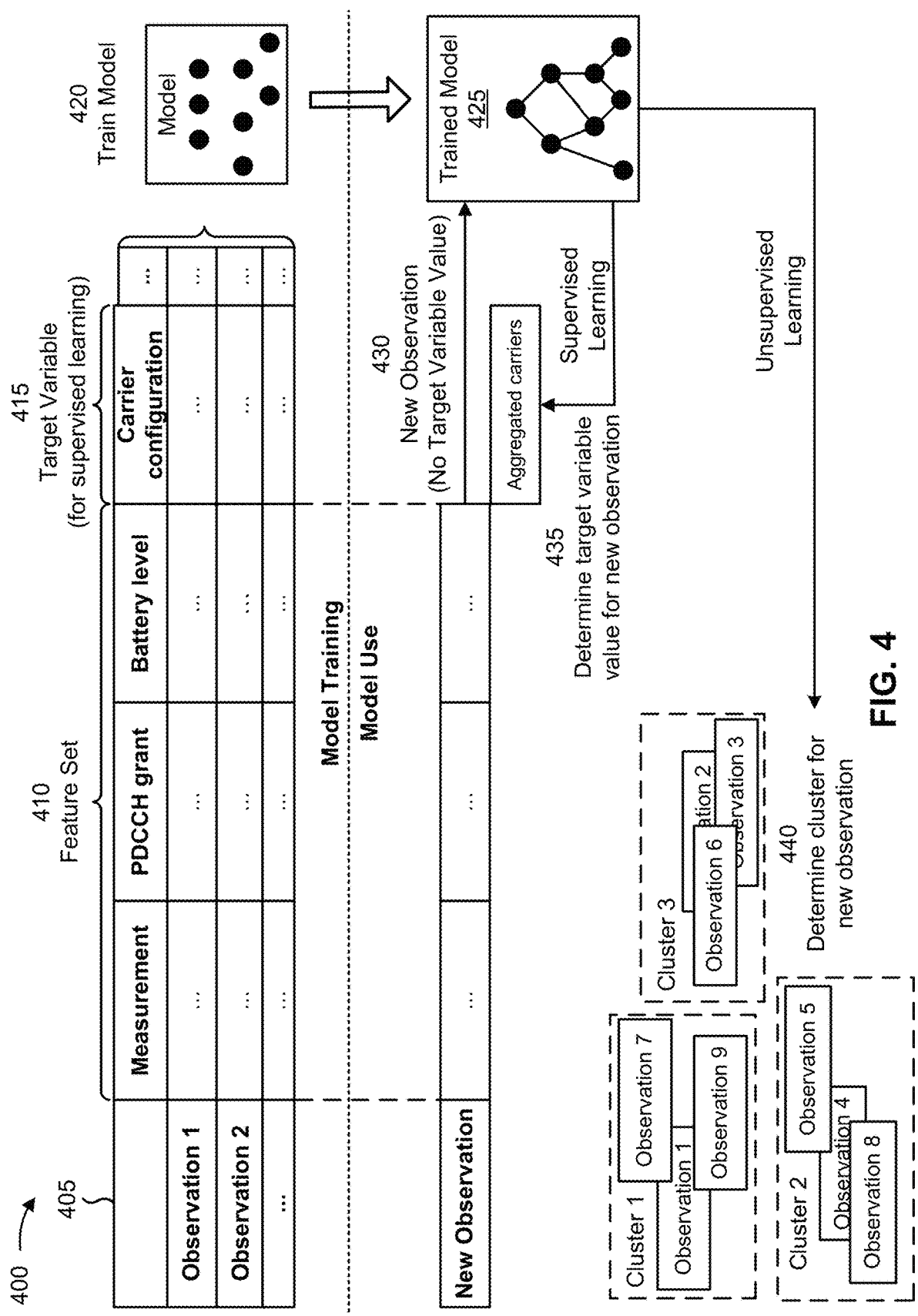
FIG. 4 is a diagram illustrating an example associated with training and/or using a machine learning model to optimize a carrier aggregation configuration, in accordance with the present disclosure.

FIG. 4 is a diagram illustrating an example 400 associated with training and/or using a machine learning model (e.g., the neural network model described in further detail elsewhere herein) to optimize a carrier aggregation configuration, in accordance with the present disclosure. The machine learning model training and usage described herein may be performed using a machine learning system. The machine learning system may include or may be included in a computing device, a server, a cloud computing environment, a UE, a base station (e.g., a gNB), and/or a 5 G core network device, such as a UE or a base station described in more detail elsewhere herein. In some aspects, the training and/or updating of the machine learning model may be performed by a different device than the usage of the machine learning model.

As shown by reference number 405, a machine learning model may be trained using a set of observations. The set of observations may be obtained from historical data, such as data gathered during one or more processes described herein. In some implementations, the machine learning system may receive the set of observations (e.g., as input) from a UE, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based at least in part on input received from the UE. For example, the machine learning system may identify a feature set (e.g., one or more features and/or feature values) by extracting the feature set from structured data, by extracting the feature set from unstructured data, and/or by receiving input from an operator.

As an example, a feature set for a set of observations may include a first feature related to a measurement associated with a serving cell and/or one or more neighbor cells (e.g., SNR, RSRP, RSRQ) associated with the UE, a second feature related to a PDCCH grant associated with the UE, a third feature related to a battery level associated with the UE, and so on. In some aspects, the feature set may include other features, such as a channel estimation value for one or more reference signals, a decoding miss or failure, a position, and/or a user behavior, among other examples.

As shown by reference number 415, the set of observations may be associated with a target variable. The target variable may represent a variable having a numeric value, a variable having a numeric value that falls within a range of values or has some discrete possible values, a variable that is selectable from one of multiple options (e.g., one of multiple classes, classifications, and/or labels), and/or a variable having a Boolean value, among other examples. A target variable may be associated with a target variable value, and a target variable value may be specific to an observation. In example 400, the target variable is a carrier configuration, such as a number of aggregated carriers and/or maximum aggregated bandwidth. The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, and/or a support vector machine algorithm, among other examples. After training, the machine learning system may store or provide the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include features related to a measurement associated with a serving cell and/or one or more neighbor cells, a PDCCH grant, a battery level, a channel estimation value, a decoding miss or failure, a position, and/or a user behavior, among other examples. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. As an example, the trained machine learning model 425 may predict a value for the target variable based on RF channel conditions and/or a user context that is predicted for the new observation, as shown by reference number 435.

In some aspects, as shown by reference number 440, the output may include information that identifies a cluster to which the new observation belongs and/or information that indicates a degree of similarity between the new observation and one or more other observations, such as when unsupervised learning is employed.

In some aspects, reporting the predicted communication parameter(s) associated with the new observation may be based at least in part on a target variable value having a particular label (e.g., classification and/or categorization), may be based at least in part on whether a target variable value satisfies one or more thresholds (e.g., whether the target variable value is greater than a threshold, is less than a threshold, is equal to a threshold, and/or falls within a range of threshold values), and/or may be based at least in part on a cluster in which the new observation is classified.

In this way, the machine learning system may apply a rigorous and automated process to determination one or more communication parameters that may maximize or otherwise optimize a power parameter and/or a performance parameter based on RF channel conditions and/or a user context that is predicted to occur in a future duration.

As indicated above, FIG. 4 is provided as an example. Other examples may differ from what is described with regard to FIG. 4.

Figure 5:
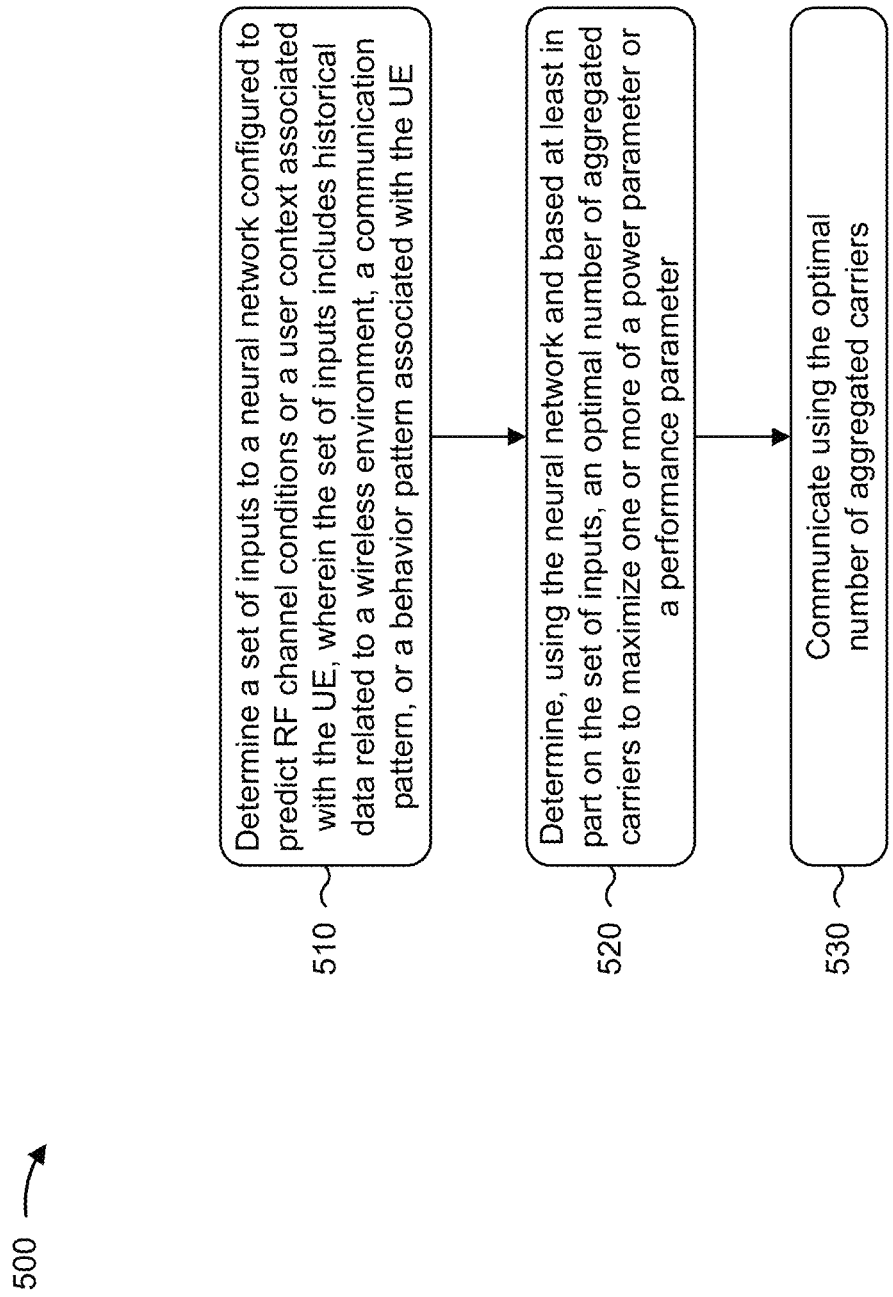
FIG. 5 is a diagram illustrating an example process associated with carrier aggregation optimization using machine learning, in accordance with the present disclosure.

FIG. 5 is a diagram illustrating an example process 500 performed, for example, by an apparatus of a UE, in accordance with the present disclosure. Example process 500 is an example where the UE (e.g., UE 120) performs operations associated with carrier aggregation optimization using machine learning.

As shown in FIG. 5, in some aspects, process 500 may include determining a set of inputs to a neural network configured to predict RF channel conditions or a user context associated with the UE, wherein the set of inputs includes historical data related to a wireless environment, a communication pattern, or a behavior pattern associated with the UE (block 510). For example, the UE (e.g., using communication manager 140 and/or determination component 608, depicted in FIG. 6) may determine a set of inputs to a neural network configured to predict RF channel conditions or a user context associated with the UE, wherein the set of inputs includes historical data related to a wireless environment, a communication pattern, or a behavior pattern associated with the UE, as described above.

As further shown in FIG. 5, in some aspects, process 500 may include determining, using the neural network and based at least in part on the set of inputs, an optimal number of aggregated carriers to maximize one or more of a power parameter or a performance parameter (block 520). For example, the UE (e.g., using communication manager 140 and/or prediction component 610, depicted in FIG. 6) may determine, using the neural network and based at least in part on the set of inputs, an optimal number of aggregated carriers to maximize one or more of a power parameter or a performance parameter, as described above.

As further shown in FIG. 5, in some aspects, process 500 may include communicating using the optimal number of aggregated carriers (block 530). For example, the UE (e.g., using communication manager 140, reception component 602, and/or transmission component 604, depicted in FIG. 6) may communicate using the optimal number of aggregated carriers, as described above.

Process 500 may include additional aspects, such as any single aspect or any combination of aspects described below and/or in connection with one or more other processes described elsewhere herein.

In a first aspect, communicating using the optimal number of aggregated carriers includes activating or deactivating one or more secondary carriers.

In a second aspect, alone or in combination with the first aspect, process 500 includes transmitting, to a base station, UAI that indicates the one or more secondary carriers that are activated or deactivated.

In a third aspect, alone or in combination with one or more of the first and second aspects, the UAI indicates a preference on one or more communication parameters to maximize one or more of the power parameter or the performance parameter.

In a fourth aspect, alone or in combination with one or more of the first through third aspects, the historical data includes a measurement history, a reference signal history, a grant history, a decoding history, a battery level history, or a user behavior history.

In a fifth aspect, alone or in combination with one or more of the first through fourth aspects, the neural network includes a first set of weights to maximize the power parameter and a second set of weights to maximize the performance parameter.

In a sixth aspect, alone or in combination with one or more of the first through fifth aspects, the first of set weights and the second set of weights have user-specified initial values.

In a seventh aspect, alone or in combination with one or more of the first through sixth aspects, the neural network is configured to optimize the first of set weights and the second set of weights using a machine learning technique.

In an eighth aspect, alone or in combination with one or more of the first through seventh aspects, the optimal number of aggregated carriers is based at least in part on one or more of predicted RF channel conditions or a predicted user context over a future duration.

In a ninth aspect, alone or in combination with one or more of the first through eighth aspects, the optimal number of aggregated carriers is further based at least in part on a predicted preference to maximize the power parameter or the performance parameter over the future duration.

In a tenth aspect, alone or in combination with one or more of the first through ninth aspects, process 500 includes receiving, from a base station, information configuring the neural network to be used to predict the RF channel conditions or the user context associated with the UE.

In an eleventh aspect, alone or in combination with one or more of the first through tenth aspects, the information configuring the neural network includes a model identifier that uniquely identifies the neural network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
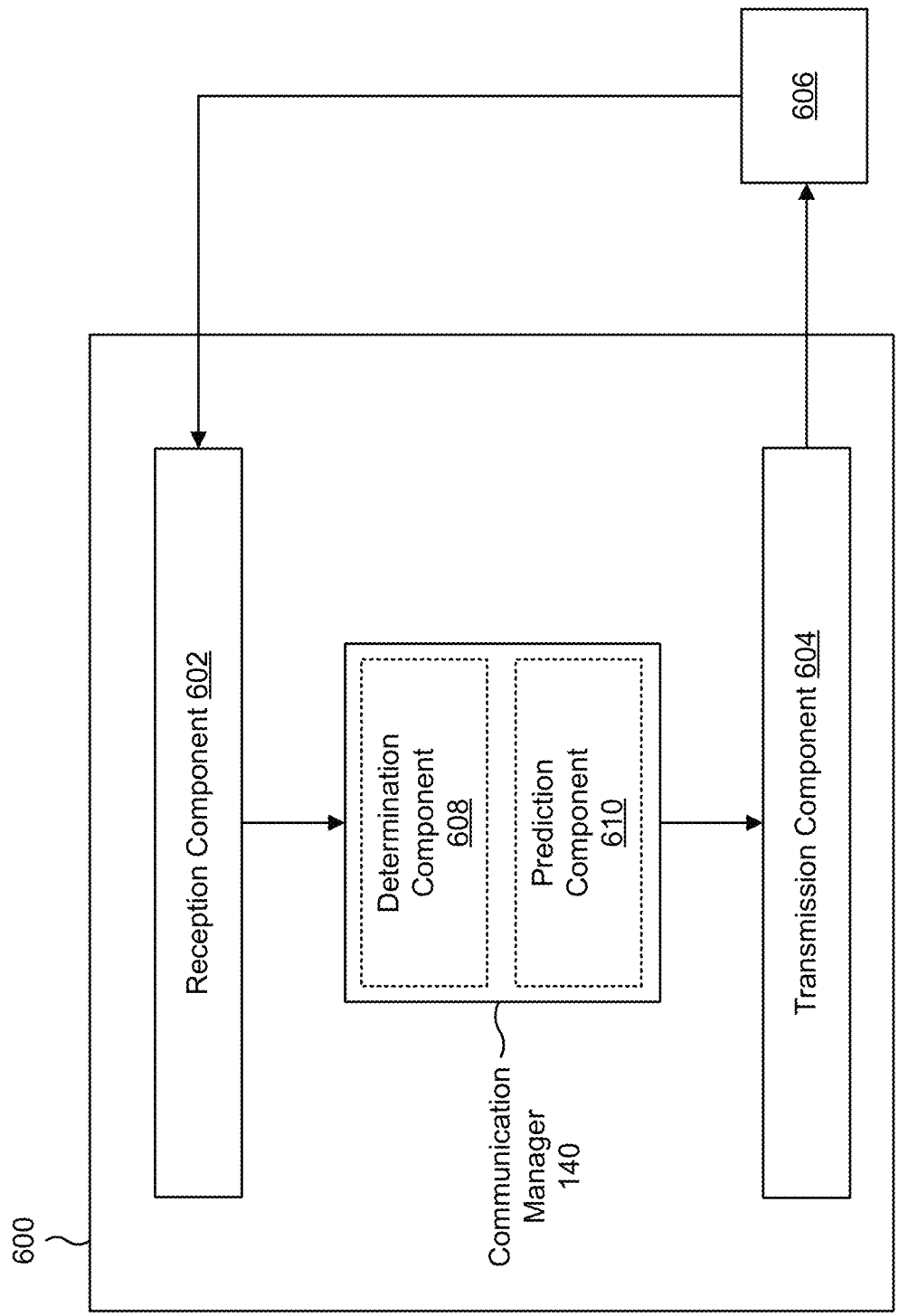
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a determination component 608 or a prediction component 610, among other examples.

In some aspects, the apparatus 600 may be configured to perform one or more operations described herein in connection with FIGS. 3-4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The determination component 608 may determine a set of inputs to a neural network configured to predict RF channel conditions or a user context associated with the UE, wherein the set of inputs includes historical data related to a wireless environment, a communication pattern, or a behavior pattern associated with the UE. The prediction component 610 may determine, using the neural network and based at least in part on the set of inputs, an optimal number of aggregated carriers to maximize one or more of a power parameter or a performance parameter. The communication manager 140, the reception component 602, and/or the transmission component 604 may communicate using the optimal number of aggregated carriers.

The transmission component 604 may transmit, to a base station, UAI that indicates the one or more secondary carriers that are activated or deactivated.

The reception component 602 may receive, from a base station, information configuring the neural network to be used to predict the RF channel conditions or the user context associated with the UE.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by an apparatus of a UE, comprising: determining a set of inputs to a neural network configured to predict RF channel conditions or a user context associated with the UE, wherein the set of inputs includes historical data related to a wireless environment, a communication pattern, or a behavior pattern associated with the UE; determining, using the neural network and based at least in part on the set of inputs, an optimal number of aggregated carriers to maximize one or more of a power parameter or a performance parameter; and communicating using the optimal number of aggregated carriers.

Aspect 2: The method of Aspect 1, wherein communicating using the optimal number of aggregated carriers includes activating or deactivating one or more secondary carriers.

Aspect 3: The method of Aspect 2, further comprising: transmitting, to a base station, UAI that indicates the one or more secondary carriers that are activated or deactivated.

Aspect 4: The method of Aspect 3, wherein the UAI indicates a preference on one or more communication parameters to maximize one or more of the power parameter or the performance parameter.

Aspect 5: The method of any of Aspects 1-4, wherein the historical data includes a measurement history, a reference signal history, a grant history, a decoding history, a battery level history, or a user behavior history.

Aspect 6: The method of any of Aspects 1-5, wherein the neural network includes a first set of weights to maximize the power parameter and a second set of weights to maximize the performance parameter.

Aspect 7: The method of Aspect 6, wherein the first of set weights and the second set of weights have user-specified initial values.

Aspect 8: The method of any of Aspects 6-7, wherein the neural network is configured to optimize the first of set weights and the second set of weights using a machine learning technique.

Aspect 9: The method of any of Aspects 1-8, wherein the optimal number of aggregated carriers is based at least in part on one or more of predicted RF channel conditions or a predicted user context over a future duration.

Aspect 10: The method of Aspect 9, wherein the optimal number of aggregated carriers is further based at least in part on a predicted preference to maximize the power parameter or the performance parameter over the future duration.

Aspect 11: The method of any of Aspects 1-10, further comprising: receiving, from a base station, information configuring the neural network to be used to predict the RF channel conditions or the user context associated with the UE.

Aspect 12: The method of Aspect 11, wherein the information configuring the neural network includes a model identifier that uniquely identifies the neural network.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a network entity, configuration information associated with determining an optimized quantity of aggregated carriers to maximize one or more of a power parameter or a performance parameter;
      receive, from the network entity, an update to one or more configured communication parameters that is based at least in part on the optimized quantity of aggregated carriers; and
      communicate using the optimized quantity of aggregated carriers based at least in part on the update to the one or more configured communication parameters.

2. The apparatus of claim 1, wherein the one or more processors are further configured to:
   determine the optimized quantity of aggregated carriers based at least in part on the configuration information.

3. The apparatus of claim 2, wherein the one or more processors are further configured to:
   transmit, to the network entity, UE assistance information (UAI) that indicates the optimized quantity of aggregated carriers based at least in part on determining the optimized quantity of aggregated carriers, wherein receiving the update to the one or more configured communication parameters is based at least in part on transmitting the UAI.

4. The apparatus of claim 2, wherein the one or more processors are further configured to:
   determine the optimized quantity of aggregated carriers using a neural network configured to predict radio frequency (RF) channel conditions or a user context associated with the UE.

5. The apparatus of claim 4, wherein the neural network is trained to predict a target variable associated with maximizing one or more of the power parameter or the performance parameter using a supervised learning model, the neural network being trained using one or more machine learning algorithms and using a set of observations that includes a feature set.

6. The apparatus of claim 5, wherein the feature set includes one or more of a measurement feature, a reference signal feature, a grant feature, a decoding feature, a channel estimation feature, a battery level feature, a position feature, or a user behavior feature, and wherein the set of observations includes one or more observations that each include values corresponding to the feature set.

7. The apparatus of claim 5, wherein the set of observations includes values for the target variable, and wherein training the neural network includes training the neural network to recognize patterns in the feature set that lead to a value of the target variable based at least in part on the set of observations including the values for the target variable.

8. The apparatus of claim 4, wherein the neural network uses an unsupervised learning model to one or more of identify a cluster to which a new observation belongs or indicate a degree of similarity between the new observation and one or more other observations.

9. The apparatus of claim 4, wherein the neural network uses a set of inputs to predict the RF channel conditions or the user context and to output one or more optimized communication parameters to maximize one or more of the power parameter or the performance parameter.

10. The apparatus of claim 9, wherein the set of inputs includes one or more of historical data, a communication pattern associated with the UE, a behavior pattern associated with the UE, or one or more current observations related to a wireless environment.

11. The apparatus of claim 1, wherein the one or more processors, to communicate using the optimized quantity of aggregated carriers, are configured to activate or deactivate one or more secondary carriers.

12. The apparatus of claim 11, wherein the one or more processors are further configured to:
   transmit, to the network entity, UE assistance information (UAI) that indicates the one or more secondary carriers that are activated or deactivated, wherein receiving the update to the one or more configured communication parameters is based at least in part on transmitting the UAI.

13. The apparatus of claim 12, wherein the UAI indicates a preference on the one or more configured communication parameters to maximize one or more of the power parameter or the performance parameter.

14. The apparatus of claim 1, wherein the optimized quantity of aggregated carriers is based at least in part on one or more of predicted radio frequency (RF) channel conditions or a predicted user context over a future duration.

15. The apparatus of claim 14, wherein the optimized quantity of aggregated carriers is further based at least in part on a predicted preference to maximize the power parameter or the performance parameter over the future duration.

16. A method of wireless communication performed by an apparatus of a user equipment (UE), comprising:
receiving, from a network entity, configuration information associated with determining an optimized quantity of aggregated carriers to maximize one or more of a power parameter or a performance parameter;
receiving, from the network entity, an update to one or more configured communication parameters that is based at least in part on the optimized quantity of aggregated carriers; and
communicating using the optimized quantity of aggregated carriers based at least in part on the update to the one or more configured communication parameters.

17. The method of claim 16, further comprising:
determining the optimized quantity of aggregated carriers based at least in part on the configuration information.

18. The method of claim 17, further comprising:
transmitting, to the network entity, UE assistance information (UAI) that indicates the optimized quantity of aggregated carriers based at least in part on determining the optimized quantity of aggregated carriers, wherein receiving the update to the one or more configured communication parameters is based at least in part on transmitting the UAI.

19. The method of claim 17, further comprising:
determining the optimized quantity of aggregated carriers using a neural network configured to predict radio frequency (RF) channel conditions or a user context associated with the UE.

20. The method of claim 19, wherein the neural network is trained to predict a target variable associated with maximizing one or more of the power parameter or the performance parameter using a supervised learning model, the neural network being trained using one or more machine learning algorithms and using a set of observations that includes a feature set.

21. The method of claim 20, wherein the set of observations includes values for the target variable, and wherein training the neural network includes training the neural network to recognize patterns in the feature set that lead to a value of the target variable based at least in part on the set of observations including the values for the target variable.

22. The method of claim 19, wherein the neural network uses an unsupervised learning model to one or more of identify a cluster to which a new observation belongs or indicate a degree of similarity between the new observation and one or more other observations.

23. The method of claim 19, wherein the neural network uses a set of inputs to predict the RF channel conditions or the user context and to output one or more optimized communication parameters to maximize one or more of the power parameter or the performance parameter.

24. The method of claim 16, wherein communicating using the optimized quantity of aggregated carriers comprises:
activating or deactivating one or more secondary carriers.

25. The method of claim 24, further comprising:
transmitting, to the network entity, UE assistance information (UAI) that indicates the one or more secondary carriers that are activated or deactivated, wherein receiving the update to the one or more configured communication parameters is based at least in part on transmitting the UAI.

26. The method of claim 25, wherein the UAI indicates a preference on the one or more configured communication parameters to maximize one or more of the power parameter or the performance parameter.

27. The method of claim 16, wherein the optimized quantity of aggregated carriers is based at least in part on one or more of predicted radio frequency (RF) channel conditions or a predicted user context over a future duration.

28. The method of claim 27, wherein the optimized quantity of aggregated carriers is further based at least in part on a predicted preference to maximize the power parameter or the performance parameter over the future duration.

29. A non-transitory computer-readable medium storing a set of instructions for wireless communication, the set of instructions comprising:
one or more instructions that, when executed by one or more processors of a user equipment (UE), cause the UE to:
receive, from a network entity, configuration information associated with determining an optimized quantity of aggregated carriers to maximize one or more of a power parameter or a performance parameter;
receive, from the network entity, an update to one or more configured communication parameters that is based at least in part on the optimized quantity of aggregated carriers; and
communicate using the optimized quantity of aggregated carriers based at least in part on the update to the one or more configured communication parameters.

* * * * *